United States Patent [19]

Ikeda

[11] 4,263,955
[45] Apr. 28, 1981

[54] PNEUMATIC RUN FLAT TIRE FOR MOTORCYCLES

[75] Inventor: Ryo Ikeda, Hiratsuka, Japan

[73] Assignee: The Yokohama Rubber Co., Ltd., Tokyo, Japan

[21] Appl. No.: 64,439

[22] Filed: Aug. 7, 1979

[30] Foreign Application Priority Data

Aug. 22, 1978 [JP] Japan .................. 53-102020

[51] Int. Cl.³ ............................................. B60C 17/00
[52] U.S. Cl. ...................... 152/330 RF; 152/353 R; 152/354 R; 152/360; 152/362 R; 152/374
[58] Field of Search ........ 152/330 R, 330 RF, 352 R, 152/352 A, 353 R, 353 C, 353 G, 354 R, 355, 357 R, 360, 361 FP, 361 DM, 361 R, 362 R, 362 CS, 374

[56] References Cited

U.S. PATENT DOCUMENTS

| | | | |
|---|---|---|---|
| 997,687 | 7/1911 | Michelin | 152/362 R |
| 3,509,929 | 5/1970 | Delobelle | 152/360 |
| 3,717,190 | 2/1973 | Boileau | 152/361 FP |
| 3,904,463 | 9/1975 | Boileau | 152/362 R |
| 3,911,987 | 10/1975 | Takusagawa et al. | 152/354 |
| 3,942,573 | 3/1976 | Lawrence et al. | 152/347 |
| 3,994,329 | 11/1976 | Masson et al. | 152/354 |
| 4,121,641 | 10/1978 | Nakasaki | 152/353 R |
| 4,142,567 | 3/1979 | Johannsen et al. | 152/362 R |
| 4,202,393 | 5/1980 | Ikeda et al. | 152/330 RF |
| 4,215,735 | 8/1980 | Sato | 152/354 R |

FOREIGN PATENT DOCUMENTS

| | | | |
|---|---|---|---|
| 589 | 2/1979 | European Pat. Off. | 152/352 A |
| 2331530 | 1/1974 | Fed. Rep. of Germany . | |
| 2449668 | 4/1974 | Fed. Rep. of Germany . | |
| 2814937 | 10/1978 | Fed. Rep. of Germany | 152/330 RF |
| 2098744 | 3/1972 | France . | |
| 2206200 | 6/1974 | France . | |
| 2249778 | 5/1975 | France . | |
| 2261888 | 9/1975 | France . | |
| 2320197 | 3/1977 | France . | |
| 7506016 | 5/1974 | Netherlands . | |

*Primary Examiner*—John T. Goolkasian
*Assistant Examiner*—Lois E. Boland
*Attorney, Agent, or Firm*—Armstrong, Nikaido, Marmelstein & Kubovcik

[57] ABSTRACT

A pneumatic run flat tire for motorcycles having a high handling stability during straight and zigzag runnings, cornering stability and durability, even when the tire is punctured while running and the pneumatic pressure inside of the tire becomes equal to atmospheric pressure. The run flat tire has a pair of sidewall-reinforcing layers, each comprising an elastic filler extending from an end location adjacent a bead core in a bead portion to the other end location in a tread portion through a sidewall portion of the tire, the elastic filler being reinforced with at least two reinforcing plies, one of which extends along one side surface of the elastic filler toward the tread portion, and then, additionally extends into the tread portion, and the other one of which extends along the other side surface of the elastic filler toward the bead portion, and the, additionally extends into the tread portion.

10 Claims, 2 Drawing Figures

PNEUMATIC RUN FLAT TIRE FOR MOTORCYCLES

BACKGROUND OF THE INVENTION

The present invention relates to a pneumatic run flat tire for motorcycles. More particularly, the present invention relates to a pneumatic run flat tire for motorcycles, which tire is provided with reinforced sidewall portions having such a high rigidity that, even when the tire is punctured while running, the tire can support the load of the motorcycle and maintain a high durability and a high steering stability thereof when the motorcycle is not only running straight ahead but, also, making a turn or running in a zigzag movement, and which tire can be easily manufactured at a high rate of productivity.

In conventional pneumatic tires which are usually used for four-wheel and two-wheel vehicles, an air chamber formed inside the tire is inflated by compressed air and the load of the vehicle is supported by the inflated air chamber having a high elasticity. Therefore, the sidewall portions of the conventional tires have a relatively low rigidity. In this type of conventional tires, when the compressed air leaks from the air chamber and the pneumatic pressure of the air chamber becomes equal to atmospheric pressure, the tire will collapse at the portion thereof which is in contact with the road surface under the weight of the vehicle in such a manner that each of the sidewall portions of the tire is folded on itself so as to project outwards from the tire-mounting rim. In this condition, the collapsed tire cannot absorb the lateral force applied to the sidewall portions of the tire when the vehicle runs in a zigzag movement or makes a turn. The lateral force applied to the tire when the vehicle runs in a zigzag movement or makes a turn, includes a cornering centrifugal force which is produced by imparting a slip angle to the tire relative to the longitudinal center line of the vehicle during turning and also includes a cambering centrifugal force which is produced by inclining the tire relative to the vertical direction in accordance with a camber angle. Therefore, the steering stability of the vehicle is significantly reduced. Also, the collapse of the tire results in an irregular rotation of the tire. The irregular rotation causes the vehicle body to produce undesirable vibrations and, thus, remarkably reduces the handling stability of the vehicle. When the tire is subjected to such irregular rotation at a high speed for a long period of time, the tire is mechanically destroyed and also thermally decomposed to such an extent that the tire can no longer be repaired. Furthermore, the irregular rotation of the collapsed tire frequently produces a separation of the tire body from the tire-mounting rim and a lateral turning of the vehicle. Both of these conditions are very dangerous for a driver.

In order to eliminate the above-mentioned disadvantages of the conventional pneumatic tires, various attempts have been made to obtain improvements of the pneumatic tires. For example, in one attempt, the tire body was firmly fixed to the tire-mounting rim so that the tire could not be removed from the rim even when the tire was punctured during running.

In another attempt, the tire was provided with a supporting member which extended from the rim into the air chamber so as to support the tread portion when the tire was punctured and as a result, collapsed.

In still another attempt, the tire body was mounted on the rim in such a manner that the tire could be firmly combined with the rim. Accordingly, the rim could, at its flange, support the load applied to the vehicle during running or turning.

In a further attempt, the sidewall portions of the tire were made of a highly rigid material so as to prevent the tire from collapsing when the tire was punctured.

In a still further attempt, in order to increase the rigidity of the sidewall portion, an elastic reinforcing member having a high stiffness was arranged in the tire. This reinforcing member extended from the bead portion to the tread crown portion through the sidewall portion, and was effective for preventing the tire from collapsing when it was punctured.

The above-mentioned attempts are each effective for improving the steering stability, handling stability and durability of a tire for four-wheel vehicles when the tire is punctured, but are not satisfactory for improving such characteristics of a tire for two-wheel vehicles, that is, motorcycles. Even in the case where the four-wheel vehicle is cornering, the tire inclines in a small angle. Therefore, the camber angle provided to the tire is within a narrow range. Accordingly, when the four-wheel vehicle makes a turn, the lateral force applied to the tire due to the cambering force is very small. That is, the lateral force consists essentially of only a cornering force. However, when the motorcycle makes a turn, it is necessary to incline the tire relative to the vertical direction by a large camber angle. This turn of the motorcycle in the inclined condition produces a large lateral cambering force together with the cornering force exerted on the tire. This great lateral force should be absorbed by the tire even when the tire is punctured for the safety of the driver. Accordingly, the above-mentioned attempts which are effective for improving the tires of four-wheel vehicles, are not always satisfactory for improving the tires of motorcycles. Generally speaking, a run flat tire for motorcycles is required to have the following features.

1. The apparent shape and configuration of the tire are similar to those of conventional tires.

2. Even when the pneumatic pressure of the air chamber of the tire is reduced to atmospheric pressure, the tire can be partly deformed but not caused to completely collapse.

3. Even when the tire is punctured, the punctured tire does not cause the motorcycle to have a reduced steering stability and handling stability not only in straight running but, also, in zigzag running and cornering.

4. Even if the tire is punctured while the motorcycle is running at a high speed of from about 150 to 200 km/hour, the irregular rotation of the punctured tire does not cause the motorcycle body to produce undesirable vibrations and the motorcycle can be stopped with high handling stability after running a certain distance.

5. Even after the tire is punctured, the motorcycle can still run for several hundred kilometers at a velocity of from 90 to 100 km/hour.

6. The tire is provided with means for preventing separation of the tire from the tire-mounting rim when the tire is punctured.

7. When the tire is punctured, the tire can be completely repaired for reuse and such repaired tire will have a high velocity running durability similar to that of the non-punctured tire.

8. The tire is a tubeless tire having a high durability.

9. Since the motorcycle is supported by only two tires, the tires can stably support the motorcycle during straight running.

10. The tire can be easily manufactured by a mass production process at a high rate of productivity and low cost.

European Patent Application Publication No. 0000589 discloses a run flat tire for motorcycles having a high handling stability, cornering stability and durability even when the tire is punctured during running and the pneumatic pressure inside of the tire becomes equal to atmospheric pressure. The run flat tire has a pair of sidewall-reinforcing layers each comprising (1) an elastic filler extending from an end location adjacent to a bead core in a bead portion to the other end location in a tread portion through a sidewall portion of the tire and (2) at least one reinforcing ply, which extends along one side surface of the elastic filler toward the tread portion, is turned up around the end of the elastic filler in the tread portion, and then, further extends along the other side surface of the elastic filler toward the bead portion. This type of run flat tire is effective for satisfying most of the above-mentioned features.

However, the process for incorporating the reinforcing ply into a body of the elastic filler comprises the three steps of adhering half of the reinforcing ply onto a side surface of the elastic filler, turning the reinforcing ply around the end of the elastic filler and, then, adhering the other half of the reinforcing ply to the other side surface of the elastic filler. That is, the process of incorporating the reinforcing ply into the elastic filler requires a large amount of labor and time and results in a high cost of the resultant tire.

Moreover, in the above-mentioned type of the tire, the sidewall reinforcing layer consisting of the reinforcing ply and the elastic filler, each of which has a relatively high rigidity and hardness, naturally exhibits a higher rigidity and hardness than those of the matrix part of the tire surrounding the sidewall reinforcing layer. Especially, in the above-mentioned type of the sidewall reinforcing layer, since the reinforcing ply is turned around the end portion of the elastic filler, the rigidity and hardness, and particularly the resistance to deformation, of a part of the tread portion in which the end portion of the sidewall reinforcing layer is embedded are remarkably different from those of the part of the tread portion adjacent to the end portion of the sidewall reinforcing layer. When the motorcycle runs in a zigzag movement, the above-mentioned remarkable difference in rigidity, hardness and resistance to deformation creates irregular discontinuous forces on a handle of the motorcycle. The irregular discontinuous forces cause the handling stability of the motorcycle to be poor and, also, the rider on the motorcycle to feel uncomfortable.

Under these circumstances, it is desired to provide a pneumatic run flat tire having none of the defects mentioned above.

SUMMARY OF THE INVENTION

An object of the present invention is to provide a pneumatic run flat tire for motorcycles, which has the same configuration and running features as those of the conventional run flat tire when the tire is inflated with compressed air, and which has a high handling stability even when the motorcycle runs in a zigzag movement.

Another object of the present invention is to provide a pneumatic run flat tire for motorcycles, which has such a feature that even when the tire is punctured while running at a high speed of, for example, from about 150 to about 200 km/hour, the body of the motorcycle does not produce any vibrations, the handling stability of the motorcycle, not only in straight running but, also, in zigzag running or in cornering, is not reduced and the velocity of the motorcycle can be increased or decreased without difficulty.

A further object of the present invention is to provide a pneumatic run flat tire for motorcycle, which has such a high durability that the tire can be run at a high speed, for example, of about 90 km/hour or more, over a distance of several hundred kilometers without thermal decomposition and mechanical destruction even after the tire is punctured and the pneumatic pressure inside of the tire becomes equal to atmospheric pressure.

A still further object of the present invention is to provide a pneumatic run flat tire for motorcycles, which is provided with reinforced sidewall portions having a proper rigidity and elasticity effective for preventing the tire from collapsing when it is punctured.

Still another object of the present invention is to provide a pneumatic run flat tire for motorcycles, which is capable of being produced by a mass production process at a high rate of productivity and low cost.

The above-mentioned objects can be accomplished by a pneumatic run flat tire for a motorcycle, of the present invention, which tire comprises:

(A) a tread portion having two shoulder-shaped edges thereof;

(B) a pair of bead portions in each of which an annular bead core is embedded;

(C) a pair of sidewall portions each extending from one of the shoulder-shaped edges of the tread portion to one of the bead portions;

(D) a carcass composed of (a) a main portion thereof which extends from one of the bead cores to the other one thereof and which is embedded in the inside surface portions of the bead portions, sidewall portions and tread portions and (b) two end portions thereof each of which is turned up around the bead core and, then, which extends into the outside surface portion of the sidewall portion, such carcass ply containing at least one tire cord fabric, and;

(E) a pair of sidewall-reinforcing layers each comprising an elastic filler which extends from an end location adjacent the bead core to the other end location in the tread portion and which is embedded in the bead portion, sidewall portion and tread portion, the elastic filler being arranged between the main portion and the end portion of the carcass, and being reinforced with at least two reinforcing plies each containing at least one tire cord fabric, and which tire is characterized in that at least one reinforcing ply extends along one side surface of the elastic filler toward the tread portion and, then, additionally extends from the end of the elastic filler into the tread portion, and at least one other reinforcing ply extends along the other side surface of the elastic filler toward the tread portion and, then, additionally extends from the end of the elastic filler into the tread portion.

In the pneumatic run flat tire of the present invention, it is important that the elastic filler be embedded in the bead portion, sidewall portion and the tread portion and have one end thereof located adjacent the bead core and the other end thereof located in the tread portion. That is, the elastic filler extends from an end location thereof adjacent to the bead core to the other end location thereof in the tread portion through the sidewall portion and the shoulder-shaped edge of the tread portion. Also, it is important that the sidewall reinforcing ply be arranged between the main portion and the end portion of the carcass.

Furthermore, it is essential for the tire of the present invention that at least the end portion of the elastic filler, which is embedded in the tread portion, be interposed between a portion of at least one reinforcing ply and a portion of at least one other reinforcing ply, and the remaining portions of these reinforcing plies extend from the end of the elastic filler toward the middle part of the tread portion.

Each reinforcing ply contains at least one tire cord fabric. At least one reinforcing ply extends along one side surface of the elastic filler, for example, facing the inside surface of the tire body, from a location in the bead or sidewall portion toward the tread portion, and then, additionally extends from the end of the elastic filler toward the middle part of the tread portion. Also, at least one other reinforcing ply extends along the other side surface of the elastic filler, for example, facing the outside surface of the tire body, from a location in the bead or sidewall portion toward the tread portion, and then, additionally extends from the end of the elastic filler toward the middle part of the tread portion.

The additionally extended portions of the reinforcing plies are very effective for making the difference in rigidity, hardness and resistance to modification small, between the part of the tread portion in which the elastic filler is embedded and the part of the tread portion adjacent to the above-mentioned part. Accordingly, the additionally extended portions of the reinforcing plies are effective for enhancing the handling stability and the comfortableness of the motorcycle for the driver, even when the motorcycle runs in a zigzag movement.

BRIEF DESCRIPTION OF THE DRAWINGS

FIG. 1 illustrates a pneumatic run flat tire body 1 for motorcycles, according to the present invention, having a tread portion 2, a pair of bead portions 3, a pair of sidewall portions 4 and a carcass 5. The tread portion 2 has two shoulder-shaped edges 6, each of which are connected to an end of the sidewall portions 4. Each of the sidewall portions 4 is connected to each of the bead portions 3. Each of a pair of axially spaced annular bead cores 7 is embedded in one of the bead portions 3.

The carcass 5 is composed of a main portion 9 and two end portions 10. The main portion 9 of the carcass 5 extends from one of the bead cores 7 to the other one thereof through, in sequence, one of the bead portions 3, one of the sidewall portions 4, the tread portion 2, the other one of the sidewall portions 4 and the other one of the bead portions 3. The main portion 9 is embedded in the inside surface layers 8 of the above-mentioned portions. Each of the two end portions 10 of the carcass 5 is turned up around one of the bead cores 7, and extends into one of the sidewall portions 4 through one of the bead portions 3. The end portion 10 is embedded in the outside surface layers 11 of the above-mentioned portions. It is preferable that the end portion 10 of the carcass 5 terminate at a location at or very close to the shoulder-shaped edge 6 of the tread portion 2. This type of end portion 10 of the carcass 5 is effective for enhancing the rigidity of the sidewall portion 4 of the tire. Referring to FIGS. 1 and 2, the carcass 5 may comprise one or more, preferably, two or more carcass plies, each composed of at least one tire cord fabric coated with an elastic polymer material. The tire cord fabric may be made of nylon 6, nylon 66, polyethylene terephthalate, rayon, insolubilized polyvinyl alcohol or steel cords. The cords may each consist of at least one filament yarn and have a total denier of 840 to 1650. The elastic polymer material by which the tire cord fabric is coated, may be selected from natural rubber, synthetic rubbers, and blends of two or more of the above-mentioned rubbers.

It is preferable that the direction of the warp in the carcass ply intersect the equator line, that is, circumference line, of the tire. The angle between the direction of the warp cords and the equator line is preferably in a range of from 25 to 60 degrees. This type of carcass ply arrangement is effective for enhancing the rigidity of the tire body. Accordingly, when the tire is deformed by a load thereon this type of carcass ply can uniformly resist against such deformation. If the deformation of the tire is unevenly resisted, the tire will be deformed unevenly. Such uneven deformation will cause a decrease in the durability of the tire. The run flat tire 1 of the present invention has a pair of sidewall-reinforcing layers 12 which are effective for preventing the collapse of the tire when the tire is deflated. Such reinforcing layers can enhance the rigidity of the sidewall portions. Referring to FIG. 2, the sidewall-reinforcing layer 12 is composed of an elastic filler 13 and a pair of reinforcing plies 14a and 14b. The elastic filler 13 extends from the bead portion 3 to the tread portion 2 through the sidewall portion 4 and the shoulder-shaped edge 6 of the tread portion 2, and is then embedded in the above-mentioned portions. It is important that the elastic filler 13 have one end 15 thereof situated adjacent to the bead core 7 and the other end 16 thereof located in the tread portion 2. The end 15 of the elastic filler 13 may be either in contact with the bead core 7, as shown in FIGS. 1 and 2, or spaced from the bead core 7 by a very small distance. It is also important that the other end 16 of the elastic filler 13 penetrate into the tread portion 2 over the shoulder-shaped edge 6 of the tread portion. That is, one end portion of the elastic filler 13 is firmly fixed in the bead portion 3 and the other end portion thereof is also firmly fixed in the tread portion 2.

In the above-mentioned arrangement of the elastic filler 13, the rigidity of the sidewall portion can be remarkably enhanced over that of conventional run flat tires. However, the rigidity of the sidewall portion can be additionally enhanced by incorporating the reinforcing plies 14a and 14b with the elastic filler 13. The reinforcing plies 14a and 14b are especially effective for increasing the rigidity of a portion of the sidewall portion close to the shoulder-shaped edge of the tread portion.

Figure 1:
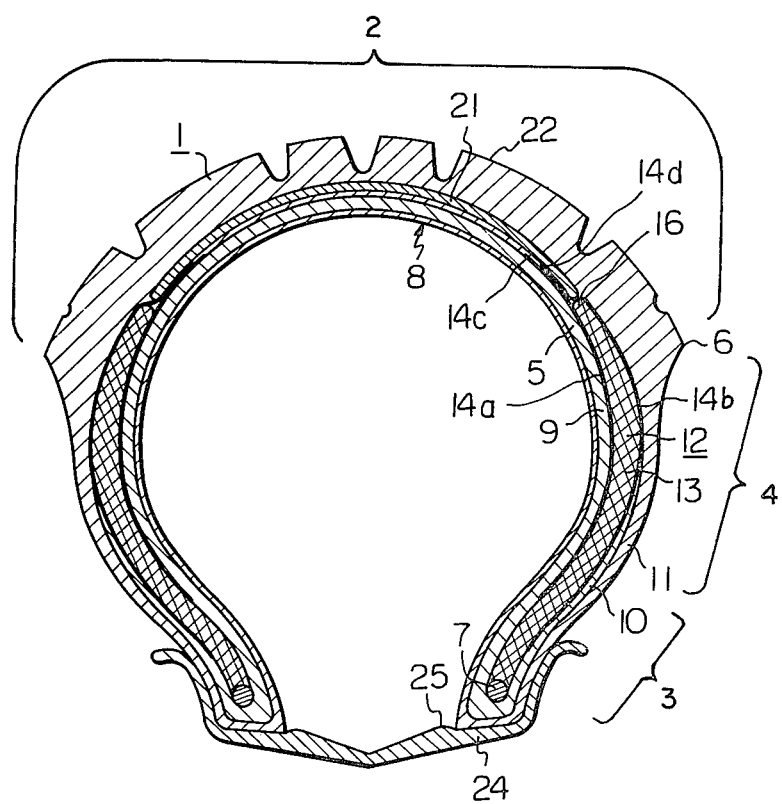
FIG. 1 is a cross-sectional view of an embodiment of the pneumatic run flat tire of the present invention.
Figure 2:
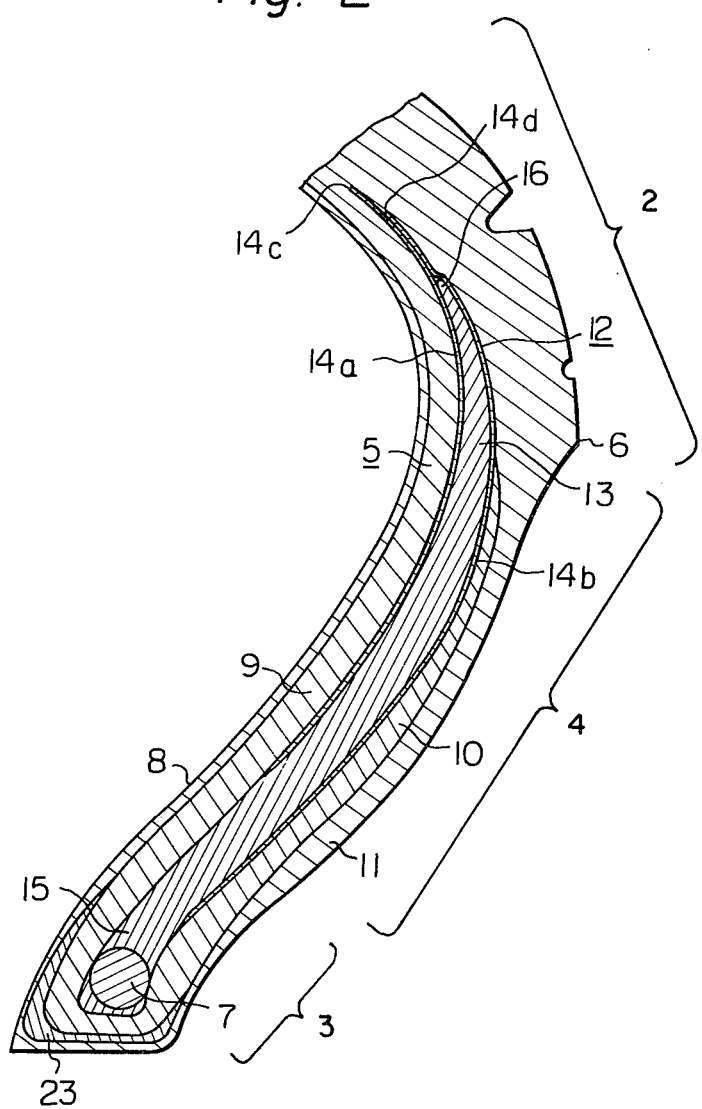
FIG. 2 is a cross-sectional view of a part of an embodiment of the pneumatic run flat tire of the present invention containing a bead portion, a sidewall portion and a shoulder-shaped edge portion of a tread portion.

In FIGS. 1 and 2, the reinforcing ply 14a extends continuously upward along the side surface of the elastic filler 13, facing the inside surface of the tire body, and then, penetrates from the end 16 of the elastic filler 13 into the tread portion toward the middle part thereof. Also, the reinforcing ply 14b extends continuously upward along the other side surface of the elastic filler 13, facing the outside surface of the tire body, and then, penetrates from the end 16 of the elastic filler 13 into the tread portion toward the middle part thereof. Accordingly, the major part, including the end portion, of the elastic filler 13 is interposed between the lower parts of the reinforcing plies 14a and 14b. The upper parts of the reinforcing plies 14a and 14b penetrate into the tread portion. Each of the reinforcing plies 14a and 14b contains at least one tire cord fabric coated with an elastic rubber material. The lower ends of the reinforcing plies 14a and 14b are located, independently from each other, either in the bead portion 3 or in the sidewall portion 4. Usually, the reinforcing plies 14a and 14b are adhered to the elastic filler 13.

The ends 14c and 14d of the reinforcing plies 14a and 14b, located in the tread portion 2, may be connected to each other so as to form a body of folded ply. However, in this case, the operation for folding the ply results in a poor rate of productivity of the tire. The locations of the ends 14c and 14d of the reinforcing plies 14a and 14b in the tread portion 2 are respectively not limited to a special location as long as the ends are located in the tread portion and the locations of the ends 14c and 14d are further from the bead core 7 than the location of the end 16 of the elastic filler 13. However, it is preferable that the end 14c of the reinforcing ply 14a which is adhered to the side surface of the elastic filler 13 facing the inside surface of the tire be located farther from the end 16 of the elastic filler 13 than the end 14d of the reinforcing ply 14b which is adhered to the other side surface of the elastic filler 13 facing the outside surface of the tire. This type of location of the ends 14c and 14d of the reinforcing plies 14a and 14b is effective for enhancing the handling stability of the motorcycle. Also, it is preferable that the thickness of the end portion of the elastic filler 13 embedded in the tread portion 2 becomes thin with the increase in distance from the bead core 7. This is effective for gradually changing the rigidity from the shoulder-shaped part 6 to the middle part of the tread portion 2.

The elastic filler 13 preferably has an elastic modulus of from 40 to 75 kg/cm$^2$, at an elongation of 100% and a Shore hardness of from 70 to 90. The elastic filler contains at least one member selected from the group consisting of vulcanized natural rubbers and synthetic rubbers. The synthetic rubber may be selected from the group consisting of styrene-butadiene copolymers, polybutadiene and polyisoprene.

Also, it is preferable that the elastic filler have a maximum thickness corresponding to from 20 to 60 percent of the maximum thickness of the sidewall portion 4.

The tire cord fabric to be contained in each of the reinforcing plies may be selected from conventional tire cord fabrics. That is, the tire cord fabric may be made of nylon 6, nylon 66, polyethylene terephthalate, rayon, insolubilized polyvinyl alcohol or steel cords. The cords may each consist of at least one filament yarn and should preferably have a denier of from 840 to 1650. The elastic polymer material to be coated on the reinforcing ply may be selected from conventional cord-coating agents.

It is preferable that the direction of the warp cords in the reinforcing ply intersect the equator line of the tire. The angle between the direction of the warp cords and the equator line is preferably in a range of from 25 to 65 degrees. This type of arrangement of the reinforcing plies is very effective for increasing the rigidity of the sidewall portion of the tire, because such arrangement produces a large uniform resistance in the reinforcing ply which can counteract the deformation of the sidewall portion under a load. That is, this type of the reinforcing plies is effective for preventing an irregular deformation of the sidewall portion.

Furthermore, for increasing the note of productivity and durability of the tire, it is preferable that the angle between the direction of the warp cords in the reinforcing ply and the equator line of the tire be greater than that between the direction of the warp cords in the carcass ply and the equator line of the tire, because this type of arrangement of the carcass ply and the reinforcing ply can remarkably increase the rigidity of the sidewall portion and simplify the production of the tire.

Referring to FIG. 1, the tread portion 2 can contain therein a reinforcing breaker layer 21 located between the carcass ply 5 and the outside surface 22 of the tread portion 2. This breaker layer 21, which is composed of at least one tire cord fabric coated with an elastic polymer as mentioned hereinbefore, is effective for reinforcing the tread portion 2. The tire cord fabric may be made of conventional tire cord yarns, as mentioned hereinbefore. It is also preferable that the direction of the warp cords in the breaker layer intersect the equator line of the tire by an angle of, for example, from 25 to 50 degrees.

When the tire is inclined from the vertical direction by a camber angle, and the tire is brought into contact with the surface of road at the shoulder-shaped edge portion of the tread portion, a large bending force is applied not only to the sidewall portion but also to the tread portion so as to deform these portions. If the tread portion exhibits a poor resistance to the deformation and is therefore greatly deformed, the steering stability of the motorcycle during cornering will become poor. Accordingly, the provided breaker layer is effective for enhancing the rigidity of the tread portion and the steering stability of the motorcycle during cornering. Especially, the breaker layer is more useful in large tires than in small tires.

Referring to FIG. 2, the bead portion 3 may contain therein a chafer strip 23 which is located around the bead core 7 so as to wrap the portion of the carcass play 5 which is turned up around the bead core 7. This chafer strip 23 is composed of at least one tire cord fabric which is coated with an elastic polymer. The chafer strip 23 is effective for increasing the rigidity of the bead portion 3.

Referring to FIG. 1, a rim 24 on which the tire 1 can be mounted has a hump 25. This hump 25 is effective for preventing the separation of the tire 1 from the rim 24 due to the slipping of the bead portion 3 while the motorcycle is running.

When the run flat tire is a tubeless tire, the inside surface of the tire is lined with an air-nonpermeable layer.

EXAMPLES 1 THROUGH 2 AND COMPARISON EXAMPLES 1 THROUGH 5

In Example 1, a pneumatic run flat tire for motorcycle having a displacement of 1000 ml was produced. This tire had a structure as illustrated in FIG. 1. The carcass was composed of four carcass plies which comprised a tire cord fabric made of rayon tire cords of 1650 denier/2 yarns and coated with vulcanized natural rubber. The carcass was arranged in the tire in such a manner that the angle between the direction of the warp cords in the carcass plies and the equator line of the tire was 32 degrees. The elastic filler had a maximum thickness of 6 mm, which corresponded to 38% of the maximum thickness of the sidewall portion of the resultant tire. The elastic filler was made of a conventional hard rubber compound having an elastic modulus of 65 kg/cm², at an elongation of 100% and a Shore hardness of 80. Each of the reinforcing plies for the elastic filler was composed of a tire cord fabric made of rayon tire cords of 1650 denier/2 yarns. The angle between the warp cords in the reinforcing ply and the equator line of the tire was 50 degrees. The reinforcing breaker layer located in the tread portion was made of two rayon tire cord fabrics in which each cord was composed of two yarns and had a denier of 1650, in the same way as that of the carcass ply. The angle between the warps in the breaker layer and the equator line of the tire was 28 degrees.

The sidewall reinforcing layer was located, in the manner shown in FIGS. 1 and 2, between the main portion and the turned-up end portion of the carcass, and an end of the sidewall reinforcing layer was in contact with the bead core.

In Example 2, the same procedures as those mentioned above were carried out except that no breaker layer was arranged in the tread portion.

In Comparison Example 1, the same procedures as those described in Example 1 were carried out, except that each of a pair of the elastic filler was reinforced by a reinforcing ply which extended along a side surface of the elastic filler, turned around the end of the elastic filler and, then, extended along the other side surface of the elastic filler.

In Comparison Example 2, the same procedures as those described in Example 1 were carried out, except that each of the reinforcing plies was terminated in the sidewall portion and did not penetrate into the tread portion.

In Comparison Example 3, the same procedures as those mentioned in Comparison Example 1 were carried out, except that the each of the reinforcing layer was arranged between the main portion of the carcass and the inside surface layer of the tire. Each reinforcing layer extended from the bead portion into the tread portion through the sidewall portion.

In Comparison Example 4, the same procedures as those mentioned in Comparison Example 1 were carried out, except that each of a pair of the sidewall reinforcing layers was arranged between the end portion of the carcass and the outside surface layer of the tire. Each reinforcing layer extended from the bead portion into the tread portion through the sidewall portion.

In Comparison Example 5, the same procedures as those mentioned in Example 1 were carried out, except that no sidewall reinforcing layer was arranged in the tire.

Each of the above-prepared tires was subjected to the following run flat running test. A pair of the tires mounted on a motorcycle and the motorcycle was run under a pneumatic pressure of the inside space of the tires equal to atmospheric pressure. The handling stabilities during straight running and zigzag running and the cornering stability of the motorcycle and the durability of the tires were evaluated. The results are shown in Table 1.

Furthermore, the tires were subjected to the following durability test. Each tire was run on a running tester under a load of 206 kg at a speed of 90 km/hour. The pneumatic pressure of the inside space of the tire was equal to atmospheric pressure. The maximum distance which the tire could run without damage was determined. The results are shown in Table 1. Table 1 also shows the rate of productivity of each tire.

TABLE 1

| Example | Real Running Test — Handling Stability Straight | Real Running Test — Handling Stability Zigzag | Cornering Stability | Durability | Durability Test by Running Tester (Km) | Rate of Productivity |
|---|---|---|---|---|---|---|
| Example 1 | 5 | 5 | 5 | — | 250 | 4 |
| 2 | 5 | 5 | 4 | — | | 4 |
| Comparison Example 1 | 5 | 4 | 5 | | 270 | 2 |
| 2 | 4 | 4 | 4 | 3 | 170 | 4 |
| 3 | 4 | 4 | 3 | 4 | 210 | 2 |
| 4 | 3 | 3 | 2 | 3 | 160 | 2 |
| 5 | 1 | 1 | 1 | 1 | 12 | 5 |

Note:
Class 5: excellent
Class 4: very good
Class 3: good (normal)
Class 2: poor
Class 1: very poor (useless)

The tire of Example 1 was subjected to the following test. The tire was run on the running tester, under a load of 206 Kg, under a pressure of the inside space of the tire equal to atmospheric pressure, at a speed of 90 Km/h, for 1 hour. No damage was found to have occurred to the tire. Therefore, the pressure of the inside space of the tire was adjusted to 2.8 Kg/cm², and this inflated tire was run on the run flat running tester under a load of 206 Kg, at a speed 120 km/h. The speed of the tire was increased at a rate of 8 km/hr per 30 minutes. The tire could reach the speed of 208 km/h without any damage occurring thereto. However, after the speed reached 209 km/hr and the tire was run at this speed for 15 minutes, a part of the tread portion of the tire was separated from the tire.

Furthermore, it was confirmed that the tire of Example 2, which had no breaker layer, was useful for a small size of motorcycle, for example, one provided with an engine having a piston stroke volume of about 100 ml or less.

As the above-mentioned examples and comparison examples clearly show, the sidewall reinforcing layers of the present invention are very effective for enhancing the handling stability not only during straight running but, also, during zigzag running, and the cornering stability and durability of the run flat tire for motorcycles, even when the tire is punctured and the pneumatic pressure is thus lost in the inside space of the tire.

What is claimed is:

1. A pneumatic run flat tire for motorcycles, comprising:
(A) a tread portion having two shoulder-shaped edges thereof;
(B) a pair of bead portions in each of which an annular bead core is embedded;
(C) a pair of sidewall portions each extending from one of the shoulder-shaped edges of said tread portion to one of said bead portions;
(D) a carcass composed of (a) a main portion thereof extending from one of said bead cores to the other one thereof and embedded in the inside surface layer of said bead portions, sidewall portions and tread portion, and (b) two end portions thereof each turned up around the bead core and, then, extending into the outside surface layer of said sidewall portion, said carcass ply containing at least one tire cord fabric, and;

(E) a pair of sidewall-reinforcing layers each comprising:

(1) an elastic filler extending from an end location adjacent said bead core to the other end location in said tread portion and embedded in said bead portion, sidewall portion and tread portion, said elastic filler being arranged between said main portion and said end portion of said carcass and being reinforced with at least two reinforcing plies each containing at least one tire cord fabric, which tire is characterized in that at least one reinforcing ply extends along one side surface of said elastic filler toward said tread portion, and then, additionally extends from the end of said elastic filler into the tread portion and at least one other reinforcing ply extends along the other side surface of said elastic filler toward said tread portion, and then, additionally extends from the end of said elastic filler into said tread portion.

2. A pneumatic run flat tire as claimed in claim 1, wherein the end of said elastic filler is in contact with said bead core.

3. A pneumatic run flat tire as claimed in claim 1, wherein said tread portion contains therein a reinforcing breaker layer located between said carcass ply and the outside surface of said tread portion.

4. A pneumatic run flat tire as claimed in claim 1, wherein the direction of the warp cords in said carcass ply intersects the equator line of said tire.

5. A pneumatic run flat tire as claimed in claim 1, wherein the direction of the warp cords in said reinforcing ply intersects the equator line of said tire.

6. A pneumatic run flat tire as claimed in claim 4 or 5, wherein the angle between the direction of the warp cords in said reinforcing ply and the equator line of said tire is greater than that between the direction of the warp cords in said carcass ply and the equator line of said tire.

7. A pneumatic run flat tire as claimed in claim 1, wherein said elastic filler has an elastic modulus of from 40 to 75 Kg/cm, at an elongation of 100% and a Shore hardness of from 70 to 90.

8. A pneumatic run flat tire as claimed in claim 1, wherein said elastic filler has a maximum thickness corresponding to from 20 to 60% of the maximum thickness of said sidewall portion.

9. A pneumatic run flat tire as claimed in claim 1, wherein said elastic filler contains at least one member selected from the group consisting of vulcanized natural rubbers and synthetic rubbers.

10. A pneumatic run flat tire as claimed in claim 1, wherein said tire cord fabric contained in said reinforcing ply is selected from the group consisting of nylon 6, nylon 66, polyethylene terephthalate, rayon, insolubilized polyvinyl alcohol and steel tire cord fabrics.

* * * * *